UNITED STATES PATENT OFFICE.

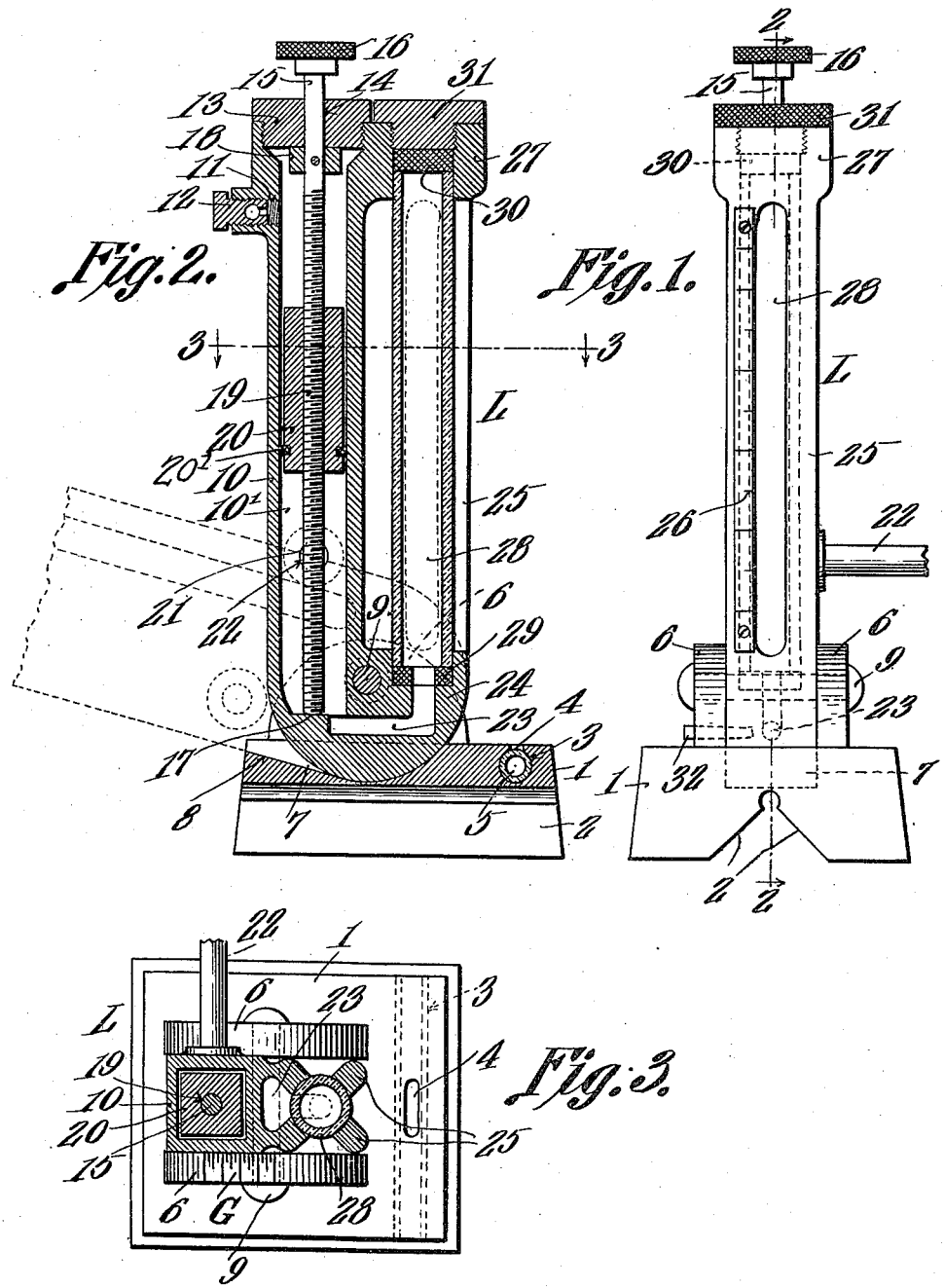

BION BRADFORD FARNHAM, OF KENMORE, NEW YORK.

HYDROSTATIC LEVEL.

1,045,385. Specification of Letters Patent. Patented Nov. 26, 1912.

Application filed February 13, 1912. Serial No. 677,387.

*To all whom it may concern:*

Be it known that I, BION BRADFORD FARNHAM, a citizen of the United States, residing at Kenmore, in the county of Erie and State of New York, have invented a new and useful Hydrostatic Level, of which the following is a specification.

The present invention relates to improvements in hydrostatic levels or instruments, and has special reference to a novel form of level in which two parallel liquid columns are provided, one of said columns being provided with a scale properly graduated, this column being made of glass, while the other column is the body of the instrument and has disposed for vertical or longitudinal movement therein a plunger, so shaped with respect to the column as to have imparted thereto only a vertical movement, such vertical movement of the plunger causing a corresponding movement of the water within the glass and providing a means whereby the water may be kept at a fixed point when desired.

A further object of the present invention is the provision of a hydrostatic level, the base of which is provided with an ordinary spirit level, the main body of the hydrostatic level being pivotally or swingingly connected to the base and disposed so that the body thereof may be tilted from a vertical or perpendicular position to any degree from 15 to 60 degrees, thereby providing a means to cause the water in the glass thereof to travel a greater or less degree or in variation according to the tilt or angle thereof.

A still further object of the invention is the provision of a hydrostatic level, so constructed as to readily ascertain the degree of incline from the horizontal or perpendicular of various shaped surfaces.

With the foregoing and other objects in view which will appear as the description proceeds, the invention resides in the combination and arrangement of parts and in the details of construction as hereinafter described and claimed, it being understood that changes in the precise embodiment of the invention herein disclosed can be made within the scope of what is claimed without departing from the spirit of the invention.

In the drawings—Figure 1 is a front elevation of the complete level in vertical position. Fig. 2 is a vertical central sectional view on line 2—2 of Fig. 1, the hydrostatic level being shown in dotted lines in lowest inclined position. Fig. 3 is a cross section taken on line 3—3 of Fig. 2.

Referring to the drawings, the numeral 1 designates the base provided with the angular slot 2 therethrough to permit the same to rest upon round or other surfaces, a transverse bore 3 having a sight aperture 4 to permit the liquid level tube 5 to be mounted therein and be observable through the aperture 4.

Formed integral upon the base and projecting upwardly therefrom are the two eyed lugs or ears 6, while the base between said lugs or ears is provided with a cavity 7, the inclined wall 8 of which will permit the hydrostatic level L to assume the position as shown in dotted lines in Fig. 2. One of the lugs 6, Fig. 3, is provided with graduations G for determining the angular degree of the level. The pivot pin 9 is adapted to pass through the said eyed lugs or ears 6 and through the lower portions of the hydrostatic level L, thus permitting various inclines or angles and the proper positioning of the said level between said eyed ears or lugs relative to the base. The base of the level fits snugly between the lugs 6 and under ordinary conditions will hold the level stationary at any desired angle.

Formed integral with the main portion of the level L, is a column or tube 10, provided with the rectangular in cross section water containing bore or column 10', although any liquid may be used in the apparatus when desired. Provided at the top and in communication with the bore 10', is a threaded vent aperture 11, provided with the removable plug 12, whereby the aperture may be regulated to permit the egress of air during the movement of the plunger 20.

Removably mounted in the upper end of the column 10' is a plug 13 provided with a concentric bore 14, which is adapted to receive the stem or shaft 15, provided at its upper end with the milled nut 16, whereby the same may be manually rotated to rotate the stem 14, the lower end 17 of said stem resting in the bottom of the column 10' concentric thereof, said stem being threaded as at 19 and carrying thereon within the said column 10' a rectangular in cross section metal, preferably brass, plunger 20, which by the rotation of the stem 14 through the means of the milled end 16 and by its being prevented from turning within the square bore of the column 10′, has imparted thereto a movement up and down within the column so as to effect the liquid therein, as will hereinafter appear. The plunger 20 is provided with the gasket 20′ to form a packing between the plunger and the walls of the column 10′.

Provided in the side of the tube 10 slightly above the bottom thereof, is a port 21, which has operably connected thereto a pipe 22, by means of which this level is placed in communication with a similar hydrostatic level.

Provided in the lower end of the level and in the boss 24, and leading from the column 10′ is a duct 23. The two spaced bars 25 are carried by the boss 24, and one of said bars is provided with a graduated scale 26, and both have their upper ends connected to the projection 27 opposite the upper end of the column 10, whereby the sight glass of the level, as at 28, is properly supported between the boss 24 and the lug 27, the lower end of the glass 28 being abutted by the gasket 29 while its upper end is abutted by the gasket 30, which is held in place by means of the removable plug 31. By this means it will be seen that the graduated scale 26 will indicate the water or liquid level within the respective columns 10′ and 28, and that by the rotation of the stem 14, the plunger 20 will be given a movement up and down within the rectangular column 10′ and impart a consequently raising or lowering of the water within the sight glass and the retention thereof at the desired fixed point or level. It will also be noted that by having the vertical glass and the parallel column 10′ tiltingly mounted with relation to the base, that the same may be moved from a vertical or perpendicular line to any degree from 15 to 60 degrees, and at variations. In the present form of instrument, as used, one eighth of an inch on a 15° angle from the horizontal line will cause the water in the glass to travel approximately one half inch.

In order to lock the level L in perpendicular position to the base, or in fact any intermediate positions the dowel pin 32 is employed.

In most forms of hydrostatic levels, the liquid in the vertical glass as a rule, changes each time the position of one or both of the levels is changed, while in the present instance the reservoir containing the plunger, back of and in line with the sight glass or tube, provides a means by which the water may be kept at a fixed point by the adjustment of the plunger in and out of the liquid contained in the column 10′. This point is a very important feature in this invention, and permits this hydrostatic level to be used in many places where it is impractical to use the present forms now on the market.

What is claimed is:

1. A hydrostatic level, having a base, a member having two communicating vertically disposed liquid containing columns pivotally connected to the base, one of said columns being a sight glass, and a plunger disposed for vertical adjustment within the other column to regulate the height of liquid within the sight glass.

2. A hydrostatic level, having a base, a member having two communicating vertically parallel liquid holding columns, one of said columns being a sight glass, said member being tiltingly mounted and capable of tilting rearwardly from the perpendicular, and means disposed within the other column and operable from the exterior for maintaining the liquid at a desired level within the sight glass.

3. A hydrostatic level, having a base, a member pivoted to said base and capable of a movement to and from a perpendicular position, said member having two communicating parallel liquid columns, one of which columns is a sight column, the other of said columns being non-circular in cross section, a stem disposed concentrically of the non-circular column and rotatable from the exterior thereof, and a plunger disposed upon said stem within the non-circular column and conforming to the shape thereof, said plunger being actuated by said stem to retain the liquid at a desired level within the sight column.

4. A hydrostatic level, having a base, a member having two communicating parallel liquid columns connected to the base and capable of a pivotal movement toward and from the perpendicular, one of said columns being a sight column and the other of said columns being non-circular in cross section, said non-circular column being provided with a liquid admission port and an air vent port, and means disposed within said non-circular column for maintaining a liquid at a desired level within the sight column.

5. A hydrostatic level, having a base, a member having two communicating parallel liquid columns connected to the base and capable of a pivotal movement toward and from the perpendicular, one of said columns being a sight column and the other of said columns being non-circular in cross section, said non-circular column being provided with a liquid admission port and an air vent port, a screw disposed within the non-circular column and extending exteriorly thereof for rotation within the column, and a plunger disposed upon the screw and fitting the non-circular column, the rotation of said screw imparting a movement to said plunger within the non-circular column to maintain the liquid at a desired level within the sight column.

6. A hydrostatic level, having a base, a member having two communicating vertically disposed liquid containing columns pivotally connected to the base, one of said columns being a sight glass, a plunger disposed for vertical adjustment within the other column to regulate the height of the liquid within the sight glass, and a horizontally disposed spirit level disposed within the base.

7. A hydrostatic level, having a base, a member having two communicating parallel liquid columns connected to the base and capable of a pivotal movement toward and from the perpendicular, one of said columns being a sight column and the other of said columns being non-circular in cross section, said non-circular column being provided with a liquid admission port and an air vent port, means disposed within said non-circular column for maintaining a liquid at a desired level within the sight column, and means for maintaining the columns perpendicular to the base.

8. A hydrostatic level, having a base, a member having two communicating parallel liquid columns connected to the base, and capable of a pivotal movement toward and from the perpendicular, one of said columns being a sight column and the other of said columns being non-circular in cross section, said non-circular column being provided with a liquid admission port and an air vent port, a screw disposed within the non-circular column and extending exteriorly thereof for rotation within the column, a plunger disposed upon the screw and fitting the non-circular column, the rotation of said screw imparting a movement to said plunger within the non-circular column to maintain the liquid at a desired level within the sight column, and means for maintaining the columns perpendicular to the base.

9. A hydrostatic level, having a base, a member having two communicating vertically disposed liquid containing columns pivotally connected to the base, one of said columns being a sight glass, a plunger disposed for vertical adjustment within the other column and adapted to regulate the height of the liquid within the sight glass, a horizontally disposed spirit level mounted within the base, and means for maintaining the columns perpendicular to the base.

In testimony that I claim the foregoing as my own, I have hereto affixed my signature in the presence of two witnesses.

BION BRADFORD FARNHAM.

Witnesses:
R. H. TEMPLETON,
E. L. McLAREN.

---

Copies of this patent may be obtained for five cents each, by addressing the "Commissioner of Patents, Washington, D. C."